United States Patent
Chakradhar et al.

(10) Patent No.: US 8,225,074 B2
(45) Date of Patent: Jul. 17, 2012

(54) METHODS AND SYSTEMS FOR MANAGING COMPUTATIONS ON A HYBRID COMPUTING PLATFORM INCLUDING A PARALLEL ACCELERATOR

(75) Inventors: Srimat T. Chakradhar, Manalapan, NJ (US); Anand Raghunathan, West Lafayette, NJ (US); Narayanan Sundaram, Berkeley, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 490 days.

(21) Appl. No.: 12/399,111

(22) Filed: Mar. 6, 2009

(65) Prior Publication Data

US 2010/0088490 A1 Apr. 8, 2010

Related U.S. Application Data

(60) Provisional application No. 61/102,165, filed on Oct. 2, 2008.

(51) Int. Cl.
*G06F 15/76* (2006.01)
(52) U.S. Cl. .......................... 712/17; 712/220
(58) Field of Classification Search .......... None
See application file for complete search history.

(56) References Cited

U.S. PATENT DOCUMENTS

| 8,035,636 | B1 * | 10/2011 | Yang | 345/419 |
|---|---|---|---|---|
| 2003/0158842 | A1 * | 8/2003 | Levy et al. | 707/3 |
| 2004/0064834 | A1 * | 4/2004 | Kuwata et al. | 725/86 |
| 2004/0190617 | A1 * | 9/2004 | Shen et al. | 375/240.16 |
| 2004/0237074 | A1 * | 11/2004 | Aronson et al. | 717/158 |
| 2005/0185852 | A1 * | 8/2005 | Song et al. | 382/243 |
| 2006/0290705 | A1 * | 12/2006 | White et al. | 345/522 |
| 2007/0008337 | A1 * | 1/2007 | White et al. | 345/629 |
| 2007/0058926 | A1 * | 3/2007 | Virdi et al. | 386/68 |
| 2008/0301691 | A1 * | 12/2008 | Mamagkakis et al. | 718/104 |
| 2009/0167763 | A1 * | 7/2009 | Waechter et al. | 345/426 |
| 2009/0189898 | A1 * | 7/2009 | Dammertz et al. | 345/426 |
| 2010/0036940 | A1 * | 2/2010 | Carey et al. | 709/224 |

* cited by examiner

*Primary Examiner* — Idriss N Alrobaye
(74) *Attorney, Agent, or Firm* — James Bitetto; Joseph Kolodka

(57) ABSTRACT

In accordance with exemplary implementations, application computation operations and communications between operations on a host processing platform may be adapted to conform to the memory capacity of a parallel accelerator. Computation operations may be split and scheduled such that the computation operations fit within the memory capacity of the accelerator. Further, the operations may be automatically adapted without any modification to the code of an application. In addition, data transfers between a host processing platform and the parallel accelerator may be minimized in accordance with exemplary aspects of the present principles to improve processing performance.

3 Claims, 5 Drawing Sheets

METHODS AND SYSTEMS FOR MANAGING COMPUTATIONS ON A HYBRID COMPUTING PLATFORM INCLUDING A PARALLEL ACCELERATOR

RELATED APPLICATION INFORMATION

This application claims priority to provisional application Ser. No. 61/102,165 filed on Oct. 2, 2008, incorporated herein by reference.

BACKGROUND

1. Technical Field

The present principles generally relate to management of computations on a computing platform, and more particularly, to management of computations and data transfers in a hybrid computing system including a parallel accelerator.

2. Description of the Related Art

Domain-specific parallel processors, such as Graphics Processing Units (GPUs) and Network Processors, permit very high levels of computational capability for specific application domains or computations with characteristics that are well suited to their architecture. Domain-specific parallel processors are often added into computing platforms that include general-purpose host processors and are used as accelerators onto which specific computations are offloaded.

For example, graphics processors, which have traditionally been used to execute only graphics processing, have emerged as a promising means to accelerate a wide range of highly parallel, computation-intensive applications. From an architectural perspective, graphics processing units (GPUs) have evolved from specialized application-specific circuits into relatively general-purpose architectures (called GPGPUs) that can be programmed to execute arbitrary computations.

Although GPU architectures are evolving to be increasingly general and programmable, they are specifically optimized for the computational characteristics of graphics processing. Therefore, they are primarily suited to application domains that share the similar computational characteristics. Such domains are, for example, highly data-parallel and computation-intensive and have high memory bandwidth with minimal control-flow and synchronization. For other workloads, mainstream multicore microprocessors retain their advantage.

Because of the great promise of GPGPUs, many applications have been parallelized on GPGPUs. Some examples include computational fluid dynamics, molecular simulations, biomedical image processing, securities modeling in finance, seismic data analysis for oil and gas exploration, image and video processing, and computer vision.

However, many challenges remain to be addressed before the potential of GPGPUs can be truly harnessed on a broader scale. Despite advances in GPU programming due to frameworks such as the Compute Unified Device Architecture (CUDA), BrookGPU from Stanford, and Stream Software Development Kit SDK, writing high-performance GPU programs remains a task that requires familiarity with the GPU architecture. The performance of a GPU program is impacted significantly and in complex ways by factors such as how a computation is organized into threads and groups of threads, register and on-chip shared memory usage, off-chip memory accessed characteristics, synchronization among threads on the GPU and with the host, and data transfer between the GPU memory and host memory. Due to these challenges, GPUs still remain inaccessible to domain experts who are accustomed to programming in very high-level languages. The approach of application-specific GPU ports by GPU programming experts is not scalable in terms of programming effort.

The development of more general programming frameworks that address the aforementioned challenges include (i) libraries and runtimes that implement data parallel programming models, (ii) compilers and autotuners for GPUs, and (iii) stream programming frameworks.

One such example is "Accelerator," which uses a shader operation graph representation of programs to map them to GPUs. However, Accelerator assumes that GPUs are not general-purpose and generates code in shader language. In addition, because the overhead for a GPU call is high, Accelerator attempts to merge operations aggressively. As another example, CUDA automatically manages the creation and execution of threads and low-level synchronization with the GPU. Other prior work includes general-purpose parallel programming streaming framework such as RapidMind, and PeakStream that provide higher-level languages and APIs that programmers can use to target heterogeneous computing platforms including GPUs. However, prior work fails to address the problem of executing computations that do not fit within GPU memory and managing Central Processing Unit (CPU)/GPU memory transfers efficiently and in a scalable manner.

As stated above, domain specific parallel processors are used with general-purpose host-processors as accelerators onto which specific computations are offloaded. Offloading a computation onto an accelerator requires synchronization and data transfer between the host processor, or its associated host memory system, and the accelerator, or its associated accelerator memory. Unfortunately, programming accelerators is significantly more complex than programming general-purpose processors. In addition to the relatively low level of abstraction supported by accelerator software interfaces such as compilers and runtime libraries, achieving good performance involves careful consideration of the synchronization and data transfer overheads involved in using accelerators.

Most application domains that utilize parallel accelerators process very large data sets. Unfortunately, the memory sizes of the accelerators are themselves often constrained, making it necessary to efficiently manage the limited accelerator memory and data transfers between the host memory and the accelerator memory. Current programming frameworks for parallel accelerators such as GPUs do not provide a means to address this problem. Specifically, current frameworks fail to address executing computations to large data sizes that do not fit within the accelerator memory. Furthermore, prior art frameworks do not provide a means for minimizing data transfers between a CPU and a parallel processor and managing data transfers in a scalable manner. As a result, programs that are written for a specific application and a specific accelerator are not easily scalable to larger data sizes and new accelerator platforms with more memory.

SUMMARY

Methods and systems in accordance with various implementations of the present principles address the deficiencies of the prior art by enabling execution of computations on a general-purpose host processor/parallel processor heterogeneous computing platform that do not fit within parallel processor memory and/or by enabling efficient management of data transfers between a DSPP and a host processor. Furthermore, exemplary implementations of the present principles use domain-specific parallel templates, rather than general-purpose abstractions, thereby permitting a higher degree of optimization based on application characteristics.

In accordance with one or more exemplary implementations of the present principles, an efficient and scalable framework for executing domain-specific parallel application templates may be executed on computing platforms that include both a host processor and a parallel accelerator. Efficiency may be achieved through the minimization of synchronization and data transfer overheads. Scalability may be achieved by abstracting the limited memory of the accelerator from a programmer, thereby permitting automatic re-targeting of applications for larger data sizes and accelerators with larger memory capacity.

One exemplary embodiment of the present principles includes a system for improving application execution processing within a hybrid computing platform comprising a host-processor including host memory on which the application is run; a parallel accelerator with finite memory capacity; an adaptation module configured to analyze a parallel template including a description of application computation operations with memory footprints that exceed the memory capacity of the accelerator and configured to generate an optimized execution plan by adapting at least one of the computation operations and communications between operations to fit the memory capacity of the accelerator; and an execution module configured to present an application program interface to the application that is representative of the template and configured to manage execution of the execution plan on the parallel accelerator to improve processing performance.

Anther exemplary embodiment of the present principles includes a method for improving application execution efficiency within a hybrid computing platform including a host-processor and a parallel accelerator, the method comprising: receiving a parallel template including a description of application computations; automatically scheduling the offload of computation operations from a host processor memory to the parallel accelerator and scheduling data transfers between the host processor memory and the parallel accelerator such that the data transfers are minimized by modifying at least one of computation operations and communications in the template to generate an optimized execution plan; and executing the optimized execution plan on the parallel accelerator in response to a call from the application.

A different exemplary embodiment of the present principles includes a method for adapting an application to a memory capacity of a parallel accelerator within a hybrid computing platform including a host-processor and the accelerator, the method comprising receiving a parallel template including a description of application computations with memory footprints that exceed a finite memory capacity of the accelerator; automatically adapting at least one of application computation operations and communications in the template to fit the finite memory capacity of the accelerator and to generate an optimized execution plan for the template; and executing the optimized execution plan on the parallel accelerator in the hybrid computing platform in response to a call from the application.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
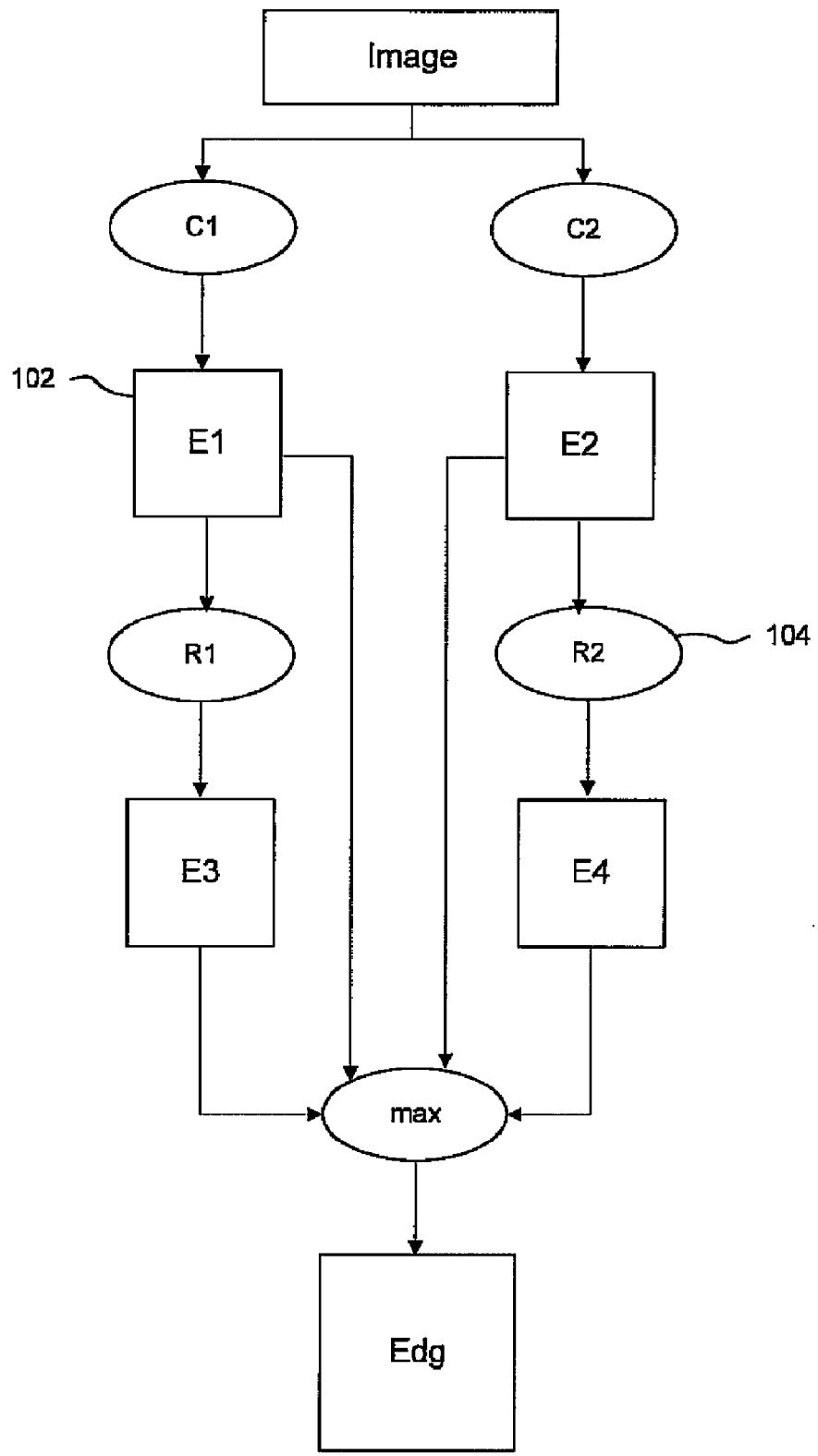
FIG. 1 is a high-level block/flow diagram of an exemplary static computation operation template that may be adapted to a parallel accelerator in accordance with exemplary aspects of the present principles.

Domain-specific parallel processors (DSPPs), such as GPUs, are commonly deployed in heterogeneous computing platforms where they are used as parallel accelerators alongside one or more host processors. In accordance with an exemplary aspect of the present principles, automatic execution of computations whose memory requirement is greater than the accelerator memory capacity may be performed without any manual annotation or change to the application program. Such automatic execution may be enabled, for example, by the use of domain-specific parallel templates with statically defined memory footprints and data transfers, and by the use of operator splitting to optimize the parallel computation such that the memory footprint of each of the operators fits within the accelerator memory.

Moreover, in accordance with another exemplary aspect of the present principles, application computations may be executed with minimized synchronization and data transfer overheads. One means by which the minimization may be achieved is by partitioning parallel computation into offload units and by employing optimized scheduling of offloads and data transfers, as discussed herein below.

One or more exemplary implementations of the present principles may employ a domain-specific compilation flow that generates an optimized execution plan for the specified template and may use a simple run-time library that orchestrates DSPP execution in accordance with the generated execution plan. Domain-specific templates can be represented as graphs of parallel operators, where the data-dependencies between the operators and the memory footprints of the operators are statically defined. Each operator may represent a significant amount of computation, such as a data-parallel operation or convolution of an image. Techniques such as operator splitting, partitioning of the operator graph into automatic offload units, and offload and data transfer scheduling may be employed to generate an efficient execution plan that is feasible for the given DSPP memory capacity. Re-targeting to different data sizes and DSPPs with different memory capacities may be automatic and abstracted from the application programmer, who may simply view the templates as parameterized application program interfaces (APIs) that implement specific algorithms or functions. Applications may be written, for example, using GPU-independent domain-specific APIs to automatically execute on NVIDIA's GPU platforms using the CUDA library. For the sake of convenience and simplicity, GPUs are herein used as an example of a DSPP to illustrate exemplary implementations of the present principles.

Many of the computationally intensive portions of applications belonging to the image processing and recognition domains are composed of templates with some common characteristics. From a computational perspective, these templates have, mostly, static task dependency graphs and statically determinable, or parameterizable, data structure sizes. The scalability of the data structure sizes with respect to the problem size is known and is deterministic. In particular, domain-specific templates may be modeled as a network of parallel operators. Performing parallel operations are the most time-consuming parts of the applications, which make them prime candidates for acceleration using parallel hardware. Such operations applications involving image processing, machine learning etc., typically execute such operations.

Referring now in detail to the figures in which like numerals represent the same or similar elements and initially to FIG. 1, the templates used in exemplary implementations of the present principles may be represented as a directed graph of operators and data structures with edges representing dependencies. An exemplary static template is illustrated in FIG. 1, wherein the boxes 102 represent the data structures and the circles 104 the operators on the data structures. For the sake of simplicity, all the data structures may be matrices. All operators are data parallel, i.e., they operate on one element of the inputs and produce one element of the output. Operations such as convolutions may be considered to be data parallel in that one output element depends on a local neighborhood of the input. As discussed herein below, these operators may be scheduled at a macro level. Further, GPU memory may be managed to reduce the amount of data transfers between the CPU and the GPU.

Parallelizing domain-specific templates involves addressing GPU constraints, most importantly, limitations in memory, which is time consuming during programming. In addition, CPU code should be separated from GPU code to conform to common software practice so that adding new GPU operators or optimized versions of existing operators does not change the CPU program, for example. Moreover, good performance should be achieved while concealing low-level details to domain expert programmers. Most of the GPU porting efforts done today typically assume that all the data fits the GPU memory. According to exemplary aspects of the present principles, applications designed for GPUs with specific data set size limitations may be adapted to process larger data sets that do not fit within the GPU memory with minimal programmer effort.

One of the major inefficiencies in writing GPU code is the limited CPU-GPU memory bandwidth. For example, a PCI-e bus, which typically has a bandwidth of about 2 GB/s, is commonly used. In such a case, the movement of data between the CPU and the GPU can easily lead to bottlenecks. For example, data parallel operations executed on the GPU can spend up to 50% of total processing time only on CPU-GPU data transfers.

Due to the fact that GPUs and CPUs have separate memory spaces, the input and the output of the operations will have to be copied between the CPU and GPU. Assuming all the temporary data structures needed do not fit in the GPU memory, the movement of data between the CPU and GPU is managed optimally to obtain efficiency and retain benefits of porting applications to GPU.

Figure 2:
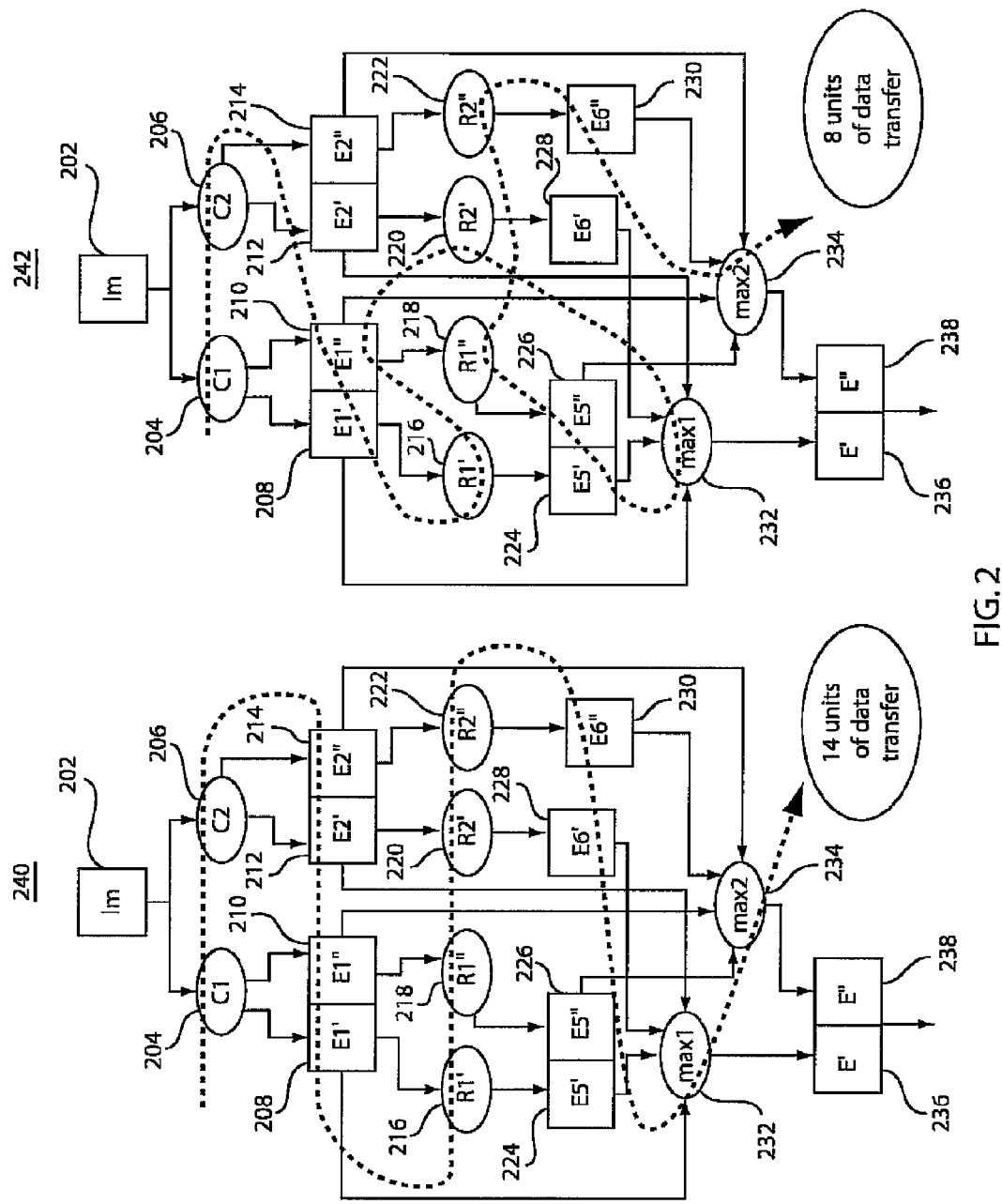
FIG. 2 is a high-level block/flow diagram illustrating different operation schedules for a computation template.

For example, with reference to FIG. 2, two schedules 240 and 242 are illustrated. Here, let the GPU memory be 5 units and the input, image (Im) 202, be 2 units. $C_1$ 204 and $C_2$ 206 represent computations that process image 202 and that output data $E_1'$ 208, $E_1''$ 210 and $E_2'$ 212 and $E_2''$ 214, respectively. Similarly, computations $R_1'$ 216, $R_1''$ 218, $R_2'$ 220, and $R_2''$ 222, process $E_1'$ 208, $E_1''$ 210, $E_2'$ 212 and $E_2''$ 214, respectively, and output data $E_5'$ 224, $E_5''$ 226, $E_6'$ 228 and $E_6''$ 230, respectively. In addition computations $max_1$ 232 and $max_2$ 234 process $E_5'$ 224, $E_6'$ 228 and $E_5''$ 226, $E_6''$ 230, respectively, to output data E' 236 and E" 238. Here, each box represents two units of data.

Schedule 240 is a breadth first schedule that performs computations in the following order: $C_1$ 204, $C_2$ 206, $R_1'$ 216, $R_1''$ 218, $R_2'$ 220, $R_2'$ 222, $max_1$ 232 and $max_2$ 234. Here, schedule 240 uses 14 units of data transfer between the CPU and the GPU. In contrast, schedule 242 uses only 8 units of data transfer by performing computations in the following order: $C_1$ 204, $C_2$ 206, $R_1'$ 216, $R_2'$ 220, $max_1$ 232, $R_1''$ 218, $R_2''$ 222, and $max_2$ 234. As state above, because data transfers can consume up to 50% of processing time operations, execution efficiency can be significantly improved by optimizing the scheduling of data transfers between a host processor and a parallel accelerator.

Figure 3:
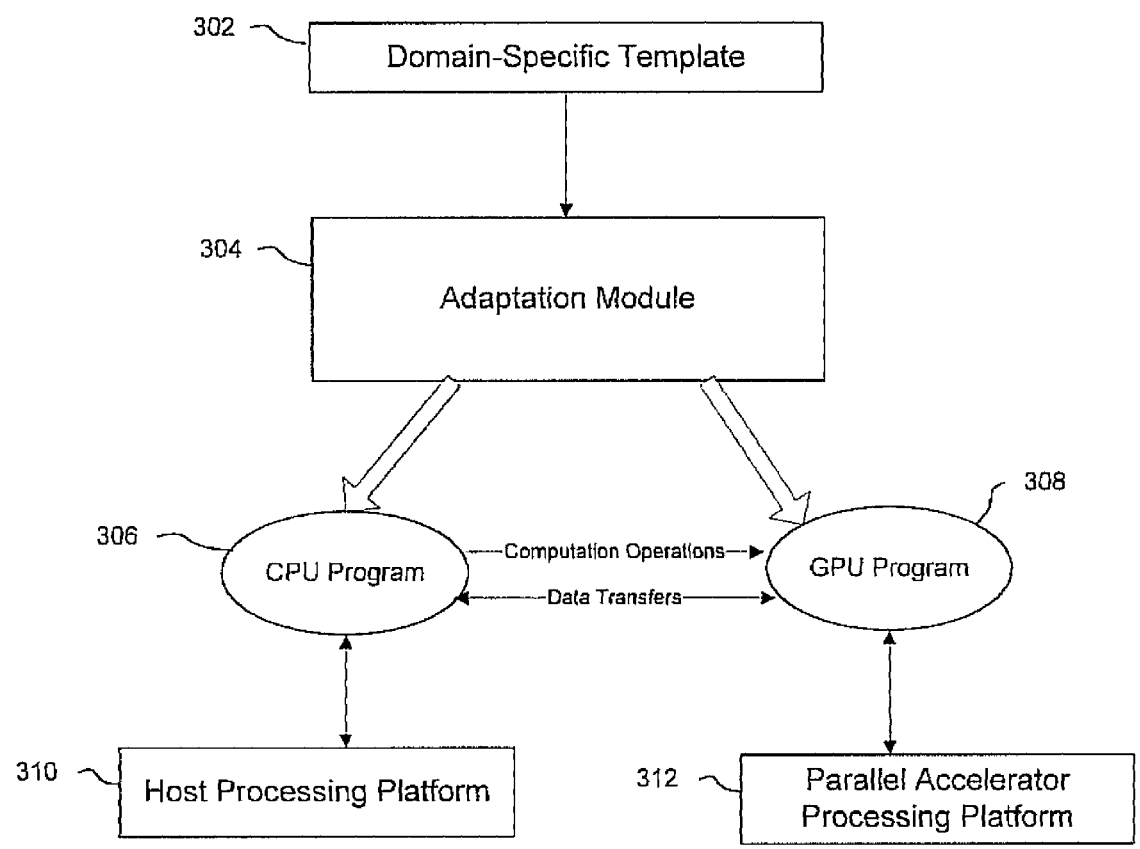
FIG. 3 is a high-level block/flow diagram illustrating an exemplary system for adapting computation operations and/or communications of an application to a parallel accelerator.

With reference now to FIG. 3, an exemplary block/flow diagram of a system 300 for automatically adapting application computations to the memory capacity of a parallel accelerator is illustrated. In accordance with one or more exemplary embodiments of the present principles, a hybrid compile and run-time framework may be implemented within an adaptation module 304 that may be employed to execute domain-specific templates 302 on heterogeneous platforms including a host processor 310 with associated host memory and a parallel accelerator 312 which has limited accelerator memory. An example of a host processor, the host processor may include a CPU and an operating system (OS) running a CPU program 306. In addition, an example of a parallel accelerator includes a GPU and a CUDA system with a corresponding GPU program 308. Although aspects are illustrated in the context of GPUs, the aspects also apply to other parallel accelerators. Computational kernels in domains, for example Recognition and Mining domains, may be expressed as computational templates that are a network of parallel operators with statically defined memory footprints and data transfers between them.

As discussed herein below, the templates 302 may be analyzed and operations therein may be automatically transformed by the adaptation module 304. Transformations may include splitting of operators that violate the accelerator memory constraint, grouping of operators into offload units that are atomically offloaded onto the accelerator, mapping of the data structures in the parallel template to the host and accelerator memory and automatically generating an optimized set of data transfers between the host memory 310 and accelerator memory 312. As discussed herein below, an optimized execution plan may be generated and fed into a run-time library, for example, which receives calls to an API that represents the domain-specific parallel template and executes the computations on the accelerator as well as the memory transfers between the host and accelerator memory.

Figure 4:
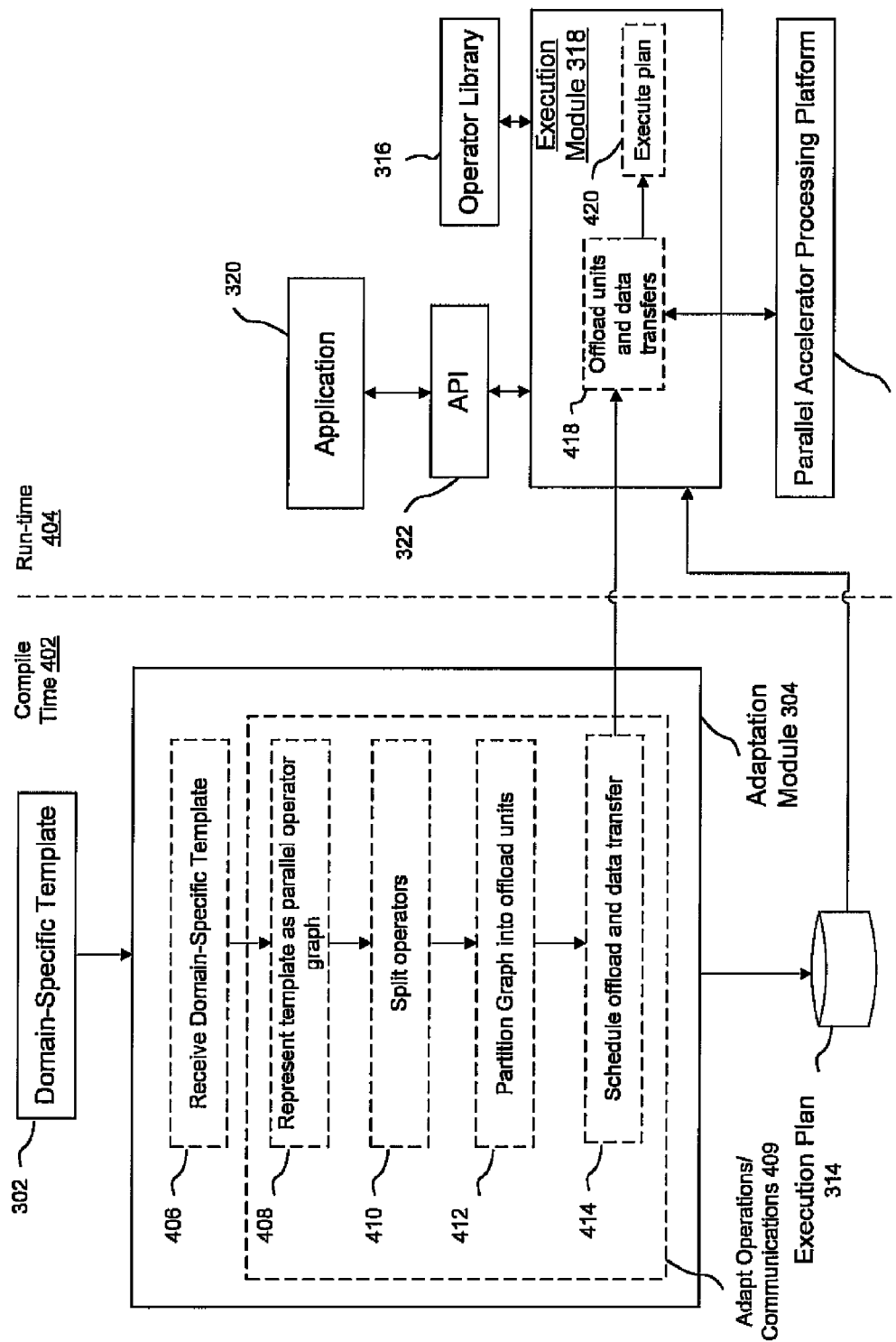
FIG. 4 is a high-level block/flow diagram illustrating an exemplary method/system for adapting computation operations of an application to a domain-specific parallel accelerator.

Referring now to FIG. 4 with continuing reference to FIG. 3, a more detailed block/flow diagram of an exemplary system and method 400 for adapting an application to a parallel accelerator memory is illustrated. The method may be split into a compile-time component 402 and a runtime component 404. In the compile time component, a description of the domain-specific templates 302 and target parallel accelerator architecture parameters that characterize the target accelerator platform may be input to module 304. Adaptation module 304 may be configured to generate, as an output, an optimized execution plan 314 for a template that specifies a sequence of offload operations and data transfers that are performed in order to execute the template.

At step 406 domain-specific templates 302 may be received by the adaptation module 304. In addition, the adaptation module may also receive parallel accelerator architecture parameters including information concerning parallel accelerator memory capacity.

At step 408, the parallel template may be analyzed and represented as a graph of a network of parallel operators with statically defined memory footprints for the operators as well as the data transfers between operators. Each vertex may represent a parallel operation and the directed edges between vertices may represent the communications between operations. Communications include interdependencies between operations. Arbitrary parallel operators are supported by the system. However, a knowledge of the semantics of operators may be provided to adaptation module 304 to permit automatic transformation of the parallel operator graph based on accelerator memory constraints and to optimize performance. It should be understood that the parallel operator graph is one exemplary representation of computation operations and communications between operations in the template. The representation may be other types of representations and may include information about memory volume used during computations, memory footprints associated with each operation and corresponding output, and/or any other information provided in a parallel operator graph.

At step 409, computation operations in the template may be automatically modified to adapt at least one of the computation operations and the communication between operations to the memory capacity of the domain-specific parallel accelerator. "At least one of" should be understood here as one of or both computation operations and communication between operations.

As an example of an adaptation, at step 410, operators within the parallel operator graph whose memory footprint exceed the accelerator memory capacity may be identified and "operator splitting" of the graph may be performed to split operators whose memory footprint, together with the associated data transfers, do not fit into the accelerator memory. The splitting may be iteratively performed until all operators in the parallel operator graph can be individually executed within the available GPU memory.

Operator splitting ensures that a template can be executed on an accelerator memory regardless of its memory limitations. It is important to note that in this exemplary implementation, the operators are data parallel such that the parallelism is over several independent data units. Thus, if an operation cannot be fit in the accelerator memory, it can be split so that it is made to execute on a small portion of the data. Splitting enables execution of arbitrarily sized data units on the accelerator, thereby providing scalability. An exemplary process for splitting data structures includes: computing the memory requirements of all operators; splitting the operators that need more memory than present in the accelerator; repeat computing and splitting until all operators are feasible to run on the accelerator; and conduct any post processing to avoid unnecessary data splits. It should be noted that if both the input and output of an operator are split, then the operator should be split as well, even if it fits the GPU memory. This does not change the feasibility, but permits more degrees of freedom so that execution on the accelerator may be performed with fewer data transfers.

The ability to easily split operations stems from the fact that the operators are data parallel. If operators are not data parallel, the adaptation module may still be used but may encounter an error if an operator does not fit the accelerator memory. In accordance with exemplary implementations of the present principles, parameters may be provided to the adaptation module to split the input/output data of an operator in particular ways to avoid such errors. For example, a large matrix-matrix multiply operation that cannot be accommodated by an accelerator memory can be modified by splitting one of the input matrices and the output matrix.

Referring again to FIG. 4, at step 412, the operation modification may further comprise partitioning the resulting graph of operators transformed by splitting into offload units, where each offload unit is a sub-graph that is atomically offloaded onto the accelerator. It should be understood that an offload unit may include one or more operations and/or one or more communications between operations. Further, offload units may be a subset of computation operations and/or communications. Having coarser-grained offload units reduces synchronization overheads between the host and the GPU. However, as the memory footprint increases, the adaptation module ensures that each offload unit can be individually executed within the available GPU memory.

After the operators are split such that every individual operation can be run on the accelerator memory, the operations may be scheduled at a macro level to achieve the most efficient code. At step 414, offload unit and data transfer scheduling is performed such that an optimized execution plan is generated for a given parallel template. The offload operations to the GPU or accelerator memory from the host processor or memory are sequenced and a minimal set of data transfers are inferred. The scheduling is performed so as to minimize the execution time overheads of synchronization and to minimize the total data transfer cost between the host processor and the GPU.

The optimal schedule given a template whose operators by themselves are individually schedulable may be determined in a number of ways. One method may be based on using Constraint Satisfiability solvers to optimize the amount of memory transferred between the CPU and GPU. For example, the problem of optimizing CPU-GPU data transfers can be written as a constraint satisfiability problem. In particular, it is possible to formulate the problem as a pseudo-boolean (PB) optimization problem. In a PB optimization problem, the variables are all Boolean. The constraints can be specified as propositional satisfiability (SAT) clauses and the objective function to be optimized is a linear function of the variables. The PB formulation for the problem is illustrated in Table 1, below.

TABLE 1

$$\text{minimize} \sum_{j=1}^{J} \sum_{t=1}^{N} (\text{Copy\_to\_CPU}_{j,t} + \text{Copy\_to\_GPU}_{j,t}) \cdot D_j$$

$$\sum_{i=1}^{N} x_{i,t} = 1$$

$$\sum_{t=1}^{N} x_{i,t} = 1$$

$$\forall i_1 \rightarrow i_2, t_1 > t_2, x_{i_1, t_1} + x_{i_2, x_2} \leq 1$$

$$\forall t \sum_{j=1}^{J} g_{j,t} D_j \leq \text{Memory}_{total}$$

$$\forall i, j, t \, [IA_{i,j} \vee OA_{i,j}] \wedge x_{i,t} \Rightarrow g_{j,t}$$
$$\forall i, j, t \, IA_{i,j} \wedge x_{i,t} \wedge \neg g_{j,t-1} \Rightarrow \text{Copy\_to\_GPU}_{j,t}$$

TABLE 1-continued $\forall j, t \; \text{Copy\_to\_GPU}_{j,t} \land g_{j,t}$ $\forall j, t \; g_{j,t-1} \Rightarrow g_{j,t-1} \land \text{Copy\_to\_GPU}_{j,t} \land [\vee_{i=1}^{N}(OA_{i,j} \land x_{i,t})]$
$\forall i, j, t \; OA_{i,j} \land x_{i,t} \land \neg \text{Copy\_to\_CPU}_{j,t+1} \Rightarrow \neg c_{j,t+1}$
$\forall j, t \; \neg c_{j,t} \land \neg \text{Copy\_to\_CPU}_{j,t+1} \Rightarrow \neg c_{j,t+1}$
$\forall j \; c_{j,0} = 1$
$\forall j \; g_{j,0} = 0$
$\forall j \in \text{Output} \; c_{j,N+1} = 1$
$\forall i, t \; \text{done}_{i,t} \Leftrightarrow x_{i,t} \vee \text{done}_{i,t-1}$
$\forall i \; \text{done}_{i,0} = 0$
$\forall j \in \text{Output}, t \; \text{dead}_{j,t} = 0$
$\forall j \not\in \text{Output}, t \; \text{dead}_{j,t+1} \Leftrightarrow \text{dead}_{j,t} \land [\vee_{i=1}^{N}(\neg IA_{i,j} \vee \text{done}_{i,t})]$
$\forall j \; \text{dead}_{j,1} = 0$
$\forall j, t \; \neg \text{dead}_{j,t} \Rightarrow c_{j,t} \vee g_{j,t}$
where
$x_{i,t}$ is 1 if operator i is executed at time step t
$g_{j,t}$ is 1 if data structure j is present in the GPU at time t
$c_{j,t}$ is 1 if data structure j is present in the CPU at time t
$D_j$ is the size of the data structure j
$\text{Memory}_{total}$ is the total amount of GPU memory present in the system
$\text{Copy\_to\_GPU}_{j,t}$ is 1 if data structure j is to be copied from the CPU to the GPU at time t
$\text{Copy\_to\_GPU}_{j,t}$ is 1 if data structure j is to be copied from the GPU to the CPU at time t
$\text{done}_{i,t}$ is 1 if operator i has been completed at time step t
$\text{dead}_{j,t}$ is 1 if data structure j is no longer needed after time t
Output is the set of all the data structures that are outputs
$IA_{i,j}$ is 1 if data structure j is an input to operator i
$OA_{i,j}$ is 1 if data structure j is an output of operator i The formulation of Table 1 may be solved using PB solvers such as MiniSAT+. However, the number of constraints scale as $O(N^2M)$, where N is the number of operators and M is the number of data structures. Hence, determining an optimal operator and data transfer schedule using Constraint Satisfiability solvers should be used for relatively small problems, such as up to a few tens of operators.

An alternative method may include using a depth-first schedule for operator scheduling and a replacement heuristic for data transfer optimization. Heuristics may be used for large problems involving several hundreds or thousands of operators, where finding the exact solution is difficult and very time consuming.

The data transfer optimization problem may be formulated as two sub-problems: to find an operator schedule; and find the optimal data transfer schedule given the operator schedule. Here, instead of solving these simultaneously, as solved using Constraint Satisfiability solvers, the two sub-problems may be solved one after the other.

Finding a good operator schedule is somewhat similar to a dataflow scheduling problem. One aim for a good operator schedule is to maximize data reuse so that transfers between a host processor and an accelerator processor are minimized. Thus, a depth-first schedule may be adopted for the operators. However, one drawback of the depth-first schedule approach is that the operator schedule does not take into account the accelerator memory limitations. Accelerator memory limitations may be accounted for within data transfer scheduling, discussed below.

After determining a schedule for the operators, a data transfer schedule may be generated. Any solution to this problem should take into account the actual amount of accelerator memory present. The replacement policy employed may include calculating the "time of final use" for each data structure, which can be computed, as the operator schedule is known. When a data structure needs to be brought into the accelerator memory, and there is insufficient space, the data structures that have the highest time of final use may be removed until the new data structure can be accommodated. In addition, data should be removed immediately after they become unnecessary.

An optimal solution for the replacement policy is to replace data that are going to be accessed furthest in the future. Hence, the replacement policy for the data transfer schedule may be optimal for a given operator schedule provided all the data structures are of the same size. If all the data structures are of different sizes, the problem is equivalent to a bin-packing/knapsack problem which is proven to be nondeterministic polynomial time (NP)-Complete.

Returning now to FIG. 4, it should be understood that at step 409, in which an optimal execution plan is generated, adaptation of operations and/or communications may include consideration of factors such as various resources available in both the host processing platform as well as the parallel accelerator. Resources may include, for example, memory sizes, speeds of computation units in the accelerator, the speed of data transfers between the host and accelerator, etc.

After an optimal execution plan 314 for a particular template is generated, at step 416, the optimal execution plan may be transmitted to a run-time execution module, such as, for example, a runtime library, which may use, for example, an operator library 316 including implementations of each of the individual operators in the original parallel template.

During runtime, at step 418, an execution module 318 may execute the execution plan by offloading and transferring data as specified in the execution plan. In addition, the execution module 318 may also allocate and manage the accelerator memory. An application 320 may written to call an API 322 that is equivalent to the parallel template that was analyzed in the compile-time portion of method 400. Here, the application need not include parallel-operator specific code, thereby significantly facilitating programming on the accelerator for programmers that are not familiar with parallel-operator specific code, such as GPU-code. The API 322 may be configured to call a simple run-time library, which received the execution plan that was generated at compile-time, as stated above. The simple run-time library is one example of an execution module 318. Here, the API exposes the functionality of the template to the application programmer. The run-time library may be underneath the API, as shown, and may orchestrate the execution of the template on the accelerator in accordance with the execution plan in response to a call from the application.

The run-time library 318 may further utilize an existing run-time library for the parallel accelerator, such as CUDA 312 for GPUs. Thus, the application 320, execution module 318, and operator library 316, execute on top of the lower-level GPU execution framework 312. The lower-level run-time libraries are complementary to the exemplary run-time library 318 which implements the execution plan. In one implementation, the two run-time libraries could be merged into a single layer that provides the combined functionality of both.

It should be understood that the optimal execution plan generation and execution discussed above may be employed to retrofit an existing application to a new parallel accelerator with a different memory capacity than an accelerator for which the application was written or on which the application was previously run. Further, the retrofitting may be performed without any modification to the application code. For example, the operator splitting and/or the offload and data transfer scheduling may be employed to adapt the existing application to a new parallel accelerator with a smaller memory capacity as discussed above. Moreover, operation and/or communication offload unit partitioning and scheduling of offloads and data transfers may be employed to retrofit an existing application to efficiently run on a new parallel accelerator with a memory capacity that is greater than the memory capacity on an accelerator for which the application was written or on which the application was previously run. Similarly, aspects of the present principles may be extended by those of ordinary skill in the art to combine operators and/or adapt communications between operations of an existing application to efficiently utilize a greater memory capacity of a new parallel accelerator. Further, offload unit partitioning and scheduling of offloads and data transfers may be adapted in addition to combining operators and/or adapting communications between operations to retrofit an existing application to run more efficiently on a new parallel accelerator with a greater memory capacity. However, these modifications are only exemplary and others may be made that are within the scope and spirit of the present principles described herein.

For purposes of illustration, exemplary implementations of system 300 and method 400 that may be applied to Recognition and Mining domains, such as, for example, edge extraction from images and Convolutional Neural Networks (CNN) domains, are described herein below. Edge detection and CNN are representative of pre-processing and core machine learning computations that are performed in such applications. Such GPU implementations may be configured to transfer input data to the GPU, perform the operation and copy the results back to the CPU immediately. This scheme allows for hand-tuning of GPU code. For example, in the Convolutional Neural Network benchmark described below, convolutions and additions may be merged into one GPU call. The scheme also facilitates execution as long as specified operators can execute on the GPU without any interference from other operators.

Edge detection is one of the most important image processing operations that is performed as a preprocessing/feature extraction step in many different applications. Computationally, it involves convolving the input image with rotated versions of an edge filter at different orientations and then combining the results by performing addition/max/max absolute value operations, etc. The general template for an edge detection is as follows:

edge_map=find_edges(Image,Kernel,num_orientations,Combine_op)

Edge detection may be performed, for example, by using a 6×7 sized edge filter at eight different orientations and combining the results using a Max operation. FIG. 1, discussed above, is an example of an edge detection template. The edge detection template is reasonably small such that a pseudo-boolean solver may be applied to find the global optimum of the Constraint Satisfiability problem described above. It can be shown that for both small and large input images to the template, scalability is improved and execution time that is within 20% of the best possible execution time may be obtained. The best possible configuration is modeled as one in which the GPU has infinite memory and all the operations can be combined into a single GPU kernel call.

With regard to CNNs, CNNs are used extensively in many machine learning tasks such as handwritten digit recognition, optical character recognition, face detection, etc. CNNs involve a large amount of computations in the form of data parallel operations. The structure of CNNs is usually very regular and symmetric and permits many different permutations of operations to obtain the same result. Here, simple non-separable 2D convolutions, data parallel additions and tan h operations may be used. In this context, the operations should be ordered in a convolutional layer. An operation that may be performed in a single convolutional layer is given below:

$$\text{output}[i][j][k] = \text{bias}[k] + \sum_{l} \sum_{s=1}^{kW} \sum_{t=1}^{kH} \text{weight}[s][t][l][k] * \text{input}[dW*(i-1+s)][dH*(j-1)+t][l]$$

Figure 5:
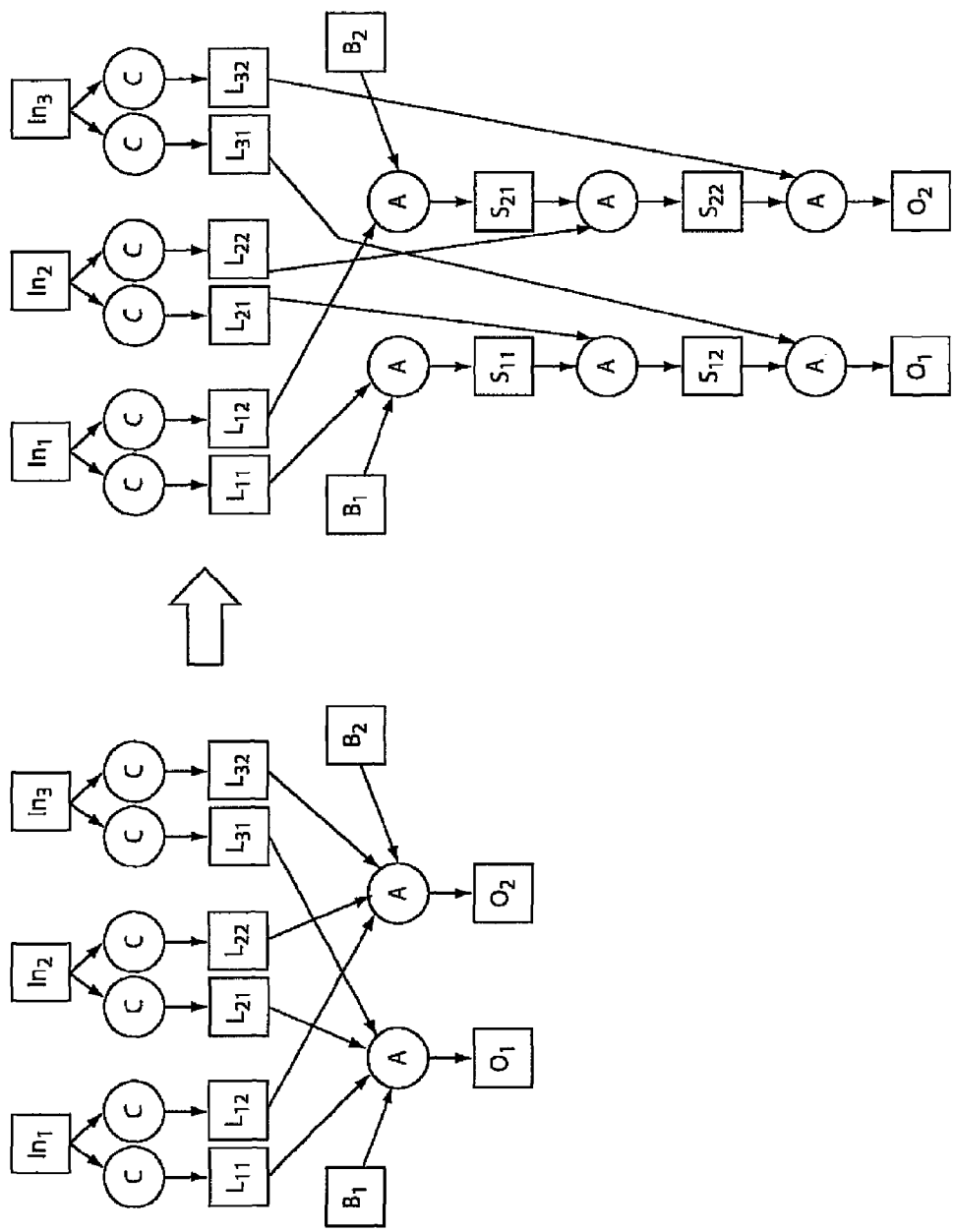
FIG. 5 is a high-level block/flow diagram of operator graphs of computation operations and/or communications for a convolutional neural networks application illustrating adaptation of the operations to a domain-specific parallel accelerator in accordance with exemplary aspects of the present principles.

The operations involved in a layer and their transformation is illustrated in FIG. 5, where operation C corresponds to a convolution, operation A corresponds to addition, $In_i$ corresponds to an input plane i, $O_j$ corresponds to output plane j, $B_j$ corresponds to Bias j and $L_{ij}, S_{ij}$ correspond to temporary data structures.

An exemplary CNN may include 11 layers, 7500 operators and 11334 data structures. For CNN templates of this size, depth-first heuristics described above should be utilized to determine an optimal execution plan. It can be shown that excellent execution rates that are three times as fast as normal CPU executions may be achieved.

As discussed above, exemplary methods and systems in accordance with the present principles automatically adapt applications with data sizes that do not fit within accelerator memory to operate efficiently. Due the higher cost and speed of domain-specific parallel processor memories, the amount of memory on most platforms employing the DSPP memory tends to be both limited and fixed in that they generally cannot be upgraded by the end-user. As a result, applications that have data sets that do not fit into GPU memory, for example, pose a particular challenge to the programmers. In accordance with exemplary aspects of the present principles, computations and associated data structures may be automatically broken down and adapted to fit within the limited DSPP memory without any effort from a programmer. In addition, the sequence of DSPP operations and data transfers are also automatically generated to achieve correct and efficient execution.

Embodiments described herein may be entirely hardware or including both hardware and software elements. In a preferred embodiment, the present invention is implemented in software and hardware, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores or communicates the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for improving application execution processing within a hybrid computing platform comprising:
- a host-processor including host memory on which the application is run;
- a parallel accelerator with finite memory capacity;
- an adaptation module configured to analyze a parallel template including a description of application computation operations with memory footprints that exceed the memory capacity of the accelerator and configured to generate an optimized execution plan by adapting at least one of the computation operations and communications between operations to fit the memory capacity of the accelerator; and
- an execution module configured to present an application program interface to the application that is representative of the template and configured to manage execution of the execution plan on the parallel accelerator to improve processing performance;
- wherein the adaptation module is further configured to (i) represent the parallel template in terms of computation operations and communications between operations comprised of parallel operators, (ii) split operators with memory footprints that exceed the memory capacity of the accelerator, (iii) partitioning the representation into offload units, each unit including a subset of computation operations and communications, for offloading onto the parallel accelerator, and (iv) to generate a schedule for unit offloading and data transfers between the host memory and the parallel accelerator, wherein the schedule is included within the execution plan and is configured such that the data transfers are minimized.

2. The system of claim 1, wherein the execution module is further configured to manage unit offloading and data transfers between the host memory and the parallel accelerator in accordance with the execution plan.

3. The system of claim 1 wherein the generation and execution of the optimized execution plan retrofits the application to run computations on the parallel accelerator without altering the code of the application.

* * * * *